(12) United States Patent
Onishi et al.

(10) Patent No.: US 8,395,337 B2
(45) Date of Patent: Mar. 12, 2013

(54) BRUSHLESS MOTOR DEVICE AND CONTROL DEVICE

(75) Inventors: Yoshitaka Onishi, Tokyo (JP); Satoshi Kawamura, Tokyo (JP); Tomohiro Ueno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 459 days.

(21) Appl. No.: 12/812,426

(22) PCT Filed: Feb. 27, 2009

(86) PCT No.: PCT/JP2009/000909
§ 371 (c)(1),
(2), (4) Date: Jul. 9, 2010

(87) PCT Pub. No.: WO2009/110206
PCT Pub. Date: Sep. 11, 2009

(65) Prior Publication Data
US 2010/0283416 A1    Nov. 11, 2010

(30) Foreign Application Priority Data
Mar. 4, 2008   (JP) ................... 2008-053574

(51) Int. Cl.
*H02P 6/06*  (2006.01)
*H02K 29/08* (2006.01)

(52) U.S. Cl. .......... 318/400.09; 318/400.03; 318/400.14
(58) Field of Classification Search ............. 318/400.01, 318/400.03, 400.09, 400.11, 400.14, 700, 318/715, 720–724
See application file for complete search history.

(56) References Cited

U.S. PATENT DOCUMENTS

| | | | |
|---|---|---|---|
| 3,760,392 A * | 9/1973 | Stich | 340/870.37 |
| 4,835,448 A * | 5/1989 | Dishner et al. | 318/400.11 |
| 6,034,494 A * | 3/2000 | Kitamine et al. | 318/400.11 |
| 6,580,235 B2 * | 6/2003 | Laurent | 318/400.1 |
| 2004/0267421 A1 | 12/2004 | Eskritt et al. | |

FOREIGN PATENT DOCUMENTS

| | | |
|---|---|---|
| DE | 103 19 537 A1 | 12/2003 |
| JP | 1-255494 A | 10/1989 |
| JP | 2004-320861 A | 11/2004 |
| JP | 2005-192338 A | 7/2005 |
| WO | WO 2007/148480 A1 | 12/2007 |

* cited by examiner

*Primary Examiner* — Bentsu Ro
(74) *Attorney, Agent, or Firm* — Birch, Stewart, Kolasch & Birch, LLP

(57) ABSTRACT

A brushless motor device switches between a 120-degree energization method and a 180-degree energization method of advancing an electrical angle by 30 degrees to drive a brushless motor 1 according to the result of a comparison between the rotational speed of the brushless motor 1 and a predetermined threshold.

4 Claims, 18 Drawing Sheets

FIG.4

(a) Single-Precision Switching Pattern (120-Degree Energization)

| | Hole Switch Output | | | Electrical Angle | Energizing Direction | |
|---|---|---|---|---|---|---|
| | U | V | W | Degree | Opening Direction | Closing Direction |
| (1) | L | H | L | 0 | V→U | U→V |
| (2) | L | H | H | 60 | W→U | U→W |
| (3) | L | L | H | 120 | W→V | V→W |
| (4) | H | L | H | 180 | U→V | V→U |
| (5) | H | L | L | 240 | U→W | W→U |
| (6) | H | H | L | 300 | V→W | W→V |

(b) Single-Precision Switching Pattern (180-Degree Energization)

| | Hole Switch Output | | | Electrical Angle | Energizing Direction | |
|---|---|---|---|---|---|---|
| | U | V | W | Degree | Opening Direction | Closing Direction |
| (1) | L | H | L | 0 | V→UW | UW→V |
| (2) | L | H | L | 30 | VW→U | U→VW |
| (3) | L | H | H | 60 | | |
| (4) | L | H | H | 90 | W→UV | UV→W |
| (5) | L | L | H | 120 | | |
| (6) | L | L | H | 150 | UW→V | V→UW |
| (7) | H | L | H | 180 | | |
| (8) | H | L | H | 210 | U→VW | VW→U |
| (9) | H | L | L | 240 | | |
| (10) | H | L | L | 270 | UV→W | W→UV |
| (11) | H | H | L | 300 | | |
| (12) | H | H | L | 330 | V→UW | UW→V |

FIG. 13
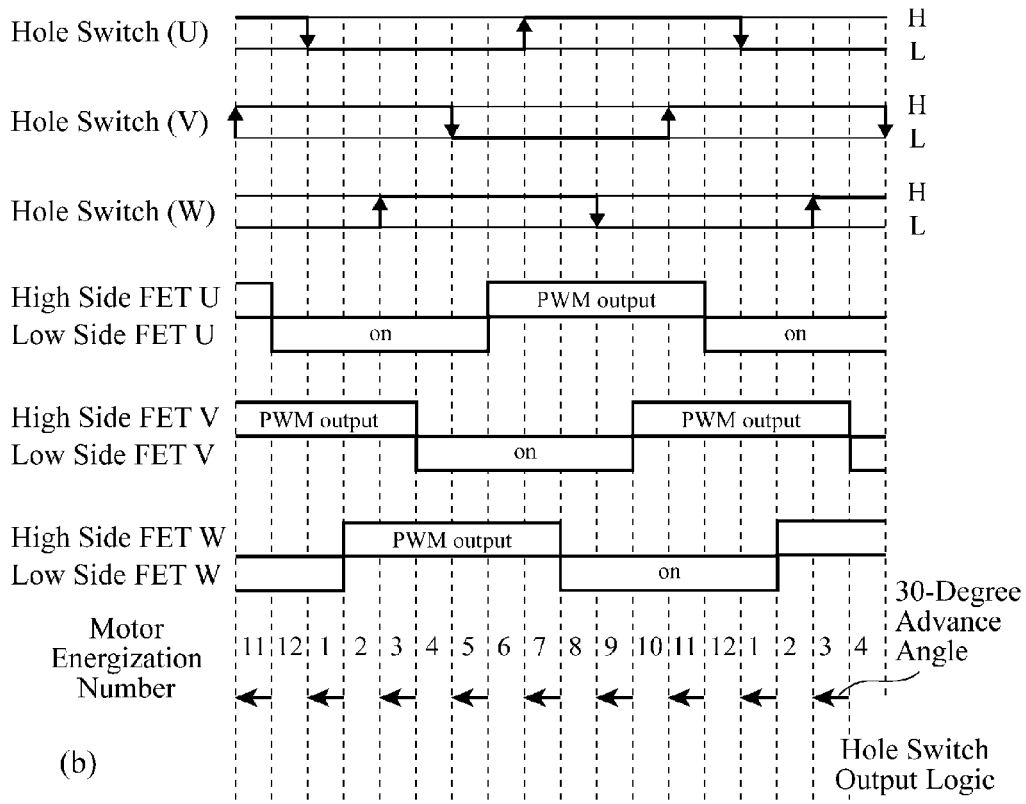
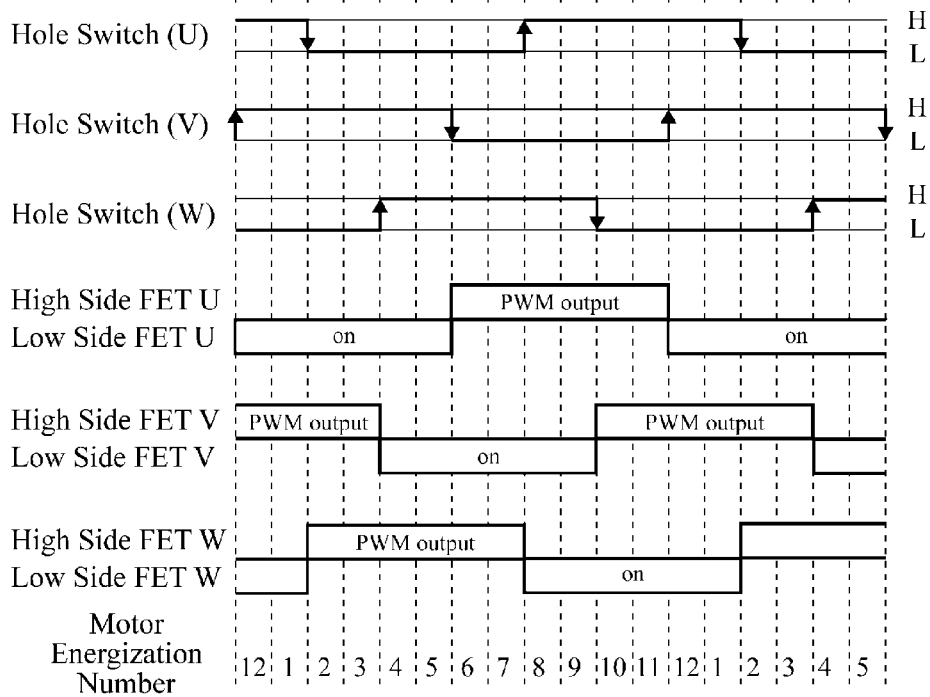

FIG.14
(a) At Time of Switching from 120-Degree Energization to 180-Degree Energization
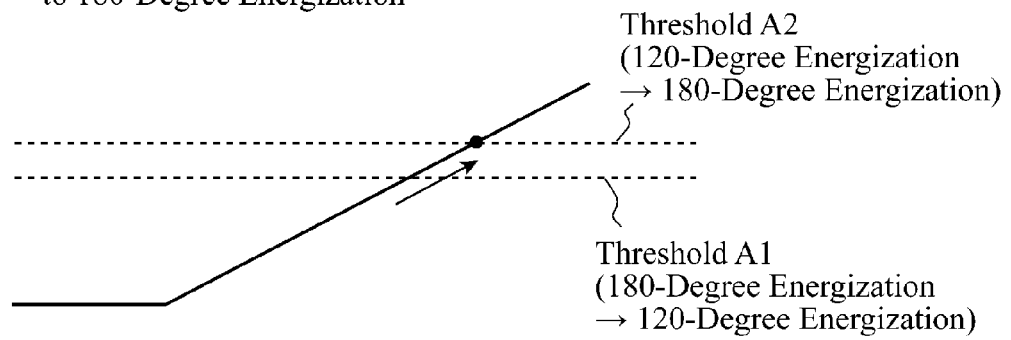
(b) At Time of Switching from 180-Degree Energization to 120-Degree Energization
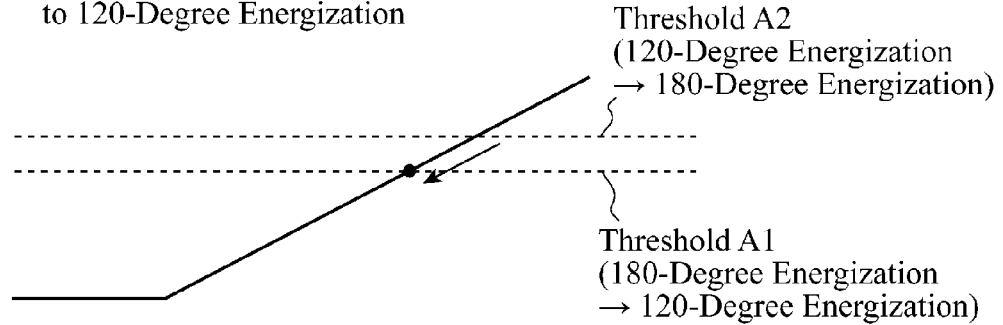

(a)

(b)

|  | 120-Degree Energization | 180-Degree Energization |
|---|---|---|
| With No Advance Angle | 100 | 114 |
| 30-Degree Advance Angle | 92 | 71 |
| 60-Degree Advance Angle | 75 | 59 |

BRUSHLESS MOTOR DEVICE AND CONTROL DEVICE

FIELD OF THE INVENTION

The present invention relates to a brushless motor device used as a driving source for driving an exhaust gas control actuator, such as an EGR (Exhaust Gas Recirculation: exhaust gas recirculation) valve used for vehicles or a VG (Variable Geometric) turbo actuator, and a control device for controlling the driving of the brushless motor.

BACKGROUND OF THE INVENTION

Conventionally, a brushless motor device is used as a driving source for driving an exhaust gas control actuator, such as an EGR valve used for vehicles or a VG turbo actuator. As methods of driving this brushless motor device, a 120-degree energization method, a 180-degree energization method, etc. are known. For example, in the 120-degree energization driving of a three-phase brushless motor, switching of coils to be energized is carried out every 60 degrees of electrical angle, and a non-energization period with an electrical angle of 60 degrees exists at the time of switching between the energizing directions of each coil. The 120-degree energization method has a feature of being able to reduce the influence of the detection of the rotor position and variations in the magnetization because of this existence of the non-energization period. Therefore, conventionally, the 120-degree energization method is typically used in many cases.

On the other hand, recent years have seen an increasing need for improvements in the responsivity of a brushless motor, though the use of the 120-degree energization driving having a non-energization period as mentioned above cannot satisfy the demands of users. For example, a drive controlling device for driving a brushless motor described in patent reference 1 controls the number of rotations of the brushless motor on the basis of a control parameter calculated according to the difference between a target number of motor rotations and the actual number of rotations, while controlling an energization phase angle on the basis of a detection signal showing the rotational position of the brushless motor. By thus correcting the energization phase angle of the driving circuit by using the control parameter for rotation number control, the drive controlling device ensures its responsivity to change in the number of rotations.

[Patent reference 1] JP,2005-192338, A

In order to improve the responsivity of the brushless motor, the energization phase angle can be corrected freely by using a rotational position sensor having a high resolution and a high-performance microcomputer, as shown in patent reference 1. However, in a low-cost system, a high-resolution rotational position sensor cannot be used.

FIG. 18 is a graph showing the degrees of responsivity of a 120-degree energization method and a 180-degree energization method which are used for a brushless motor having variations in a rotor rotational position sensor which can carry out detection every 60 degrees of electrical angle, and shows the results of performing simulations of the degrees of responsivity which the 120-degree energization method and the 180-degree energization method exhibit until the position of a rotor reaches its target position in the case of changing the above-mentioned target position step by step. In this case, a curved line denoted by a reference character A in FIG. 18 shows the result of the simulation of the degree of responsivity of the 120-degree energization driving (an advance angle of 0 degrees), and a curved line denoted by a reference character B in FIG. 18 shows the result of the simulation of the degree of responsivity of the 180-degree energization driving (an advance angle of 0 degrees).

In FIG. 18, the degree of responsivity of the 180-degree energization driving (an advance angle of 0 degrees) is slower than that of the 120-degree energization driving (an advance angle of 0 degrees). The 180-degree energization method thus has a wide energization width, though the 180-degree energization method exhibits a lesser degree of responsivity compared with that of the 120-degree energization method until the position of the rotor reaches the target position, as shown in FIG. 18. Therefore, even if switching between energization methods having different degrees of responsivity is simply carried out, any desired degree of responsivity cannot be provided.

The present invention is made in order to solve the above-mentioned problem, and it is therefore an object of the present invention to provide a brushless motor device that improves the responsivity of a brushless motor by properly switching between a 120-degree energization method and a 180-degree energization method, and a control device which controls the driving of the brushless motor.

DESCRIPTION OF THE INVENTION

A brushless motor device in accordance with the present invention includes: a three-phase double-precision brushless motor having a rotational position sensor for detecting a rotational position of a rotor; and a control device for calculating a value of a parameter related to a rotational speed as a parameter for switching between energization methods on a basis of a detection signal of the rotational position sensor, and for switching from a 120-degree energization method to a 180-degree energization method of advancing an electrical angle by 30 degrees to drive the brushless motor when the above-mentioned parameter has a value exceeding a first threshold, and further switching to a 180-degree energization method of advancing the electrical angle by 60 degrees when the parameter has a value exceeding a second threshold, in which the brushless motor includes a stator arranged fixedly, a rotor which rotates when the stator is excited sequentially with a plurality of excitation patterns, the rotor having a predetermined number of poles, and a rotor rotational position sensor having a resolution corresponding to a 30-degree electrical angle of the rotor.

In accordance with the present invention, because the three-phase double-precision brushless motor is provided with the stator, the rotor, and the rotational position sensor, and the control device switches from the 120-degree energization method to the 180-degree energization method of advancing the electrical angle by 30 degrees to drive the double-precision brushless motor when the parameter related to the rotational speed has a value exceeding the first threshold, and further switches to a 180-degree energization method of advancing the electrical angle by 60 degrees when the parameter has a value exceeding the second threshold, there is provided an advantage of being able to improve the resolution of the detection of the rotational position of the rotor which the brushless motor has to n times as high as that of a single-precision brushless motor device, switch to the 180-degree energization which can control the rotational speed throughout a wide range of rotational speeds which cannot be supported by the 120-degree energization without impairing both the responsibility of the 120-degree energization and that of the 180-degree energization, and improve the responsivity of the brushless motor.

BRIEF DESCRIPTION OF THE FIGURES

FIG. 4 is a view for explaining a relation among an energizing direction, an electrical angle, and the outputs of hole switches at the time of driving the brushless motor device shown in FIG. 1;

FIG. 13 is a timing chart showing a relation between the energizing direction at the time of rotating the rotor in the valve opening direction of opening the valve and the signals outputted from the hole switches in each of the case of using the 180-degree energization with no advance angle, and the case of using the 180-degree energization driving with an advance angle of 30 degrees;

FIG. 14 is a view for explaining a hysteresis characteristic provided for a criterion by which to determine whether to switch between the energizations;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
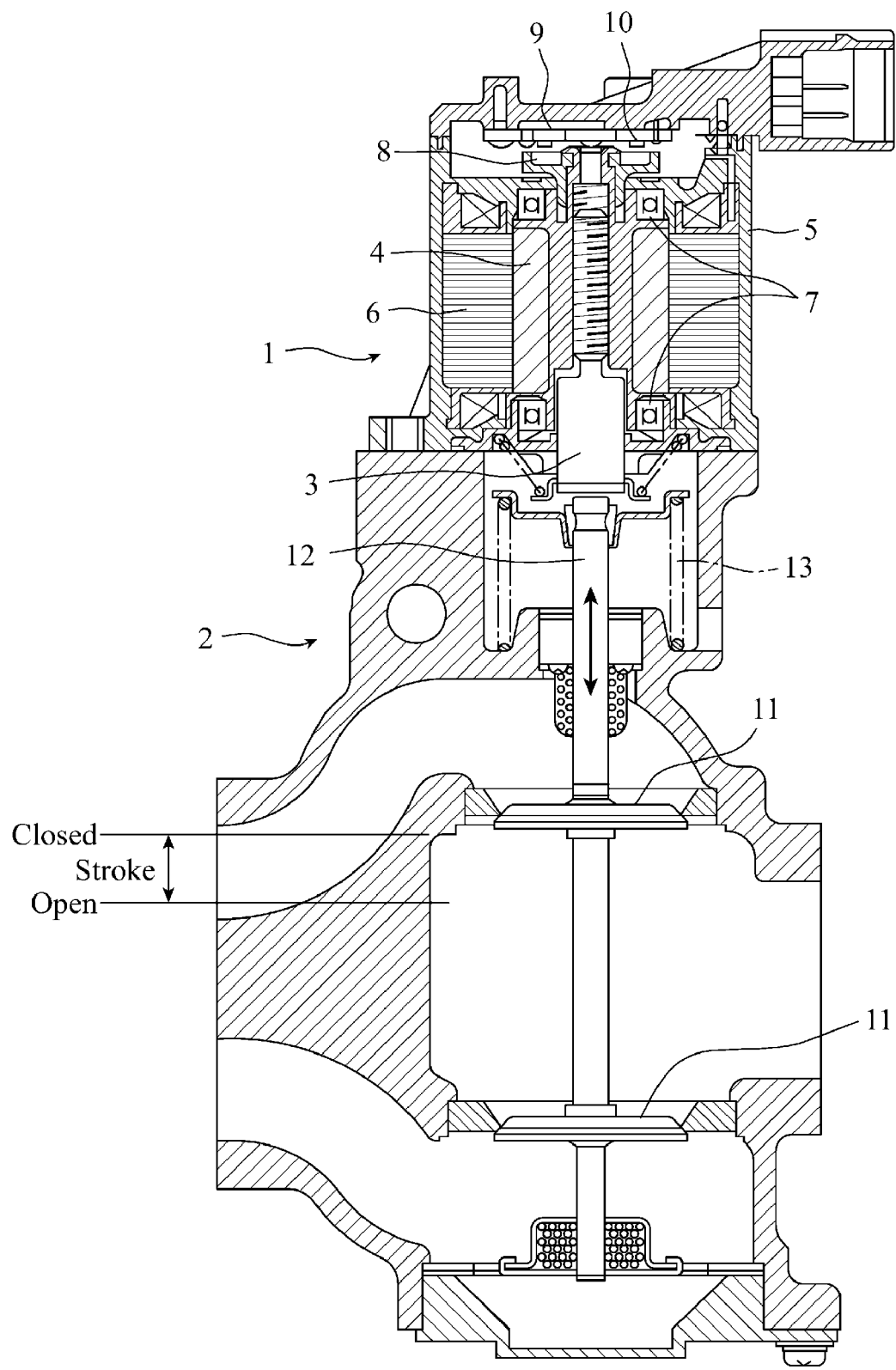
FIG. 1 is a cross-sectional view showing the structure of an EGR valve to which a brushless motor device in accordance with Embodiment 1 of the present invention is applied to the axis direction, and is taken along an axis of the EGR valve.

FIG. 1 is a cross-sectional view showing the structure of an EGR valve to which a brushless motor device in accordance with Embodiment 1 of the present invention is applied, and is taken along an axis of the EGR valve. This EGR valve is roughly divided into a brushless motor 1 and a valve mechanism 2. The brushless motor 1 is configured in such a way that a cylindrical rotor 4 screwed onto a motor shaft 3 is inserted into a hollow portion of a stator 6 secured to a case 5, and is rotatably supported by a bearing 7. Furthermore, a magnet 8 for magnetic pole position detection is secured to the rotor 4 in such a way as to be perpendicular to the axis of the rotor 4.

Furthermore, hole switches (a rotor rotational position sensor) 10 are mounted on a printed circuit board 9. Each of the hole switches 10 is comprised of an IC in which a Hall element is incorporated. The printed circuit board 9 is attached to the case 5 in such a way that the hole switches 10 are positioned opposite to the magnet 8 for magnetic pole position detection. A rotation of the rotor 4 enables the motor shaft 3 screwed into the rotor 4 to move in a direction of the axis of the rotor (in an upward or downward direction shown in FIG. 1), and a screw thread is formed in each of the motor shaft 3 and the rotor 4 in such a way that the amount of travel of the motor shaft 3 per one rotation of the rotor 4 is made to be a predetermined one.

A valve shaft 12 to which a valve 11 is secured is disposed in the valve mechanism 2, and the axis of the valve shaft is arranged in such a way as to be aligned with that of the motor shaft 3. This valve shaft 12 is pushed toward a direction in which the valve 11 is closed (referred to as a "valve closing direction" from here on) by a return spring 13 in order to implement a fail safe function. The motor shaft 3 is brought into contact with an end of the valve shaft 12 in such a way that the valve shaft 12 can move in a direction of the axis of the valve shaft (in a direction of an arrow shown in the figure).

Figure 2:
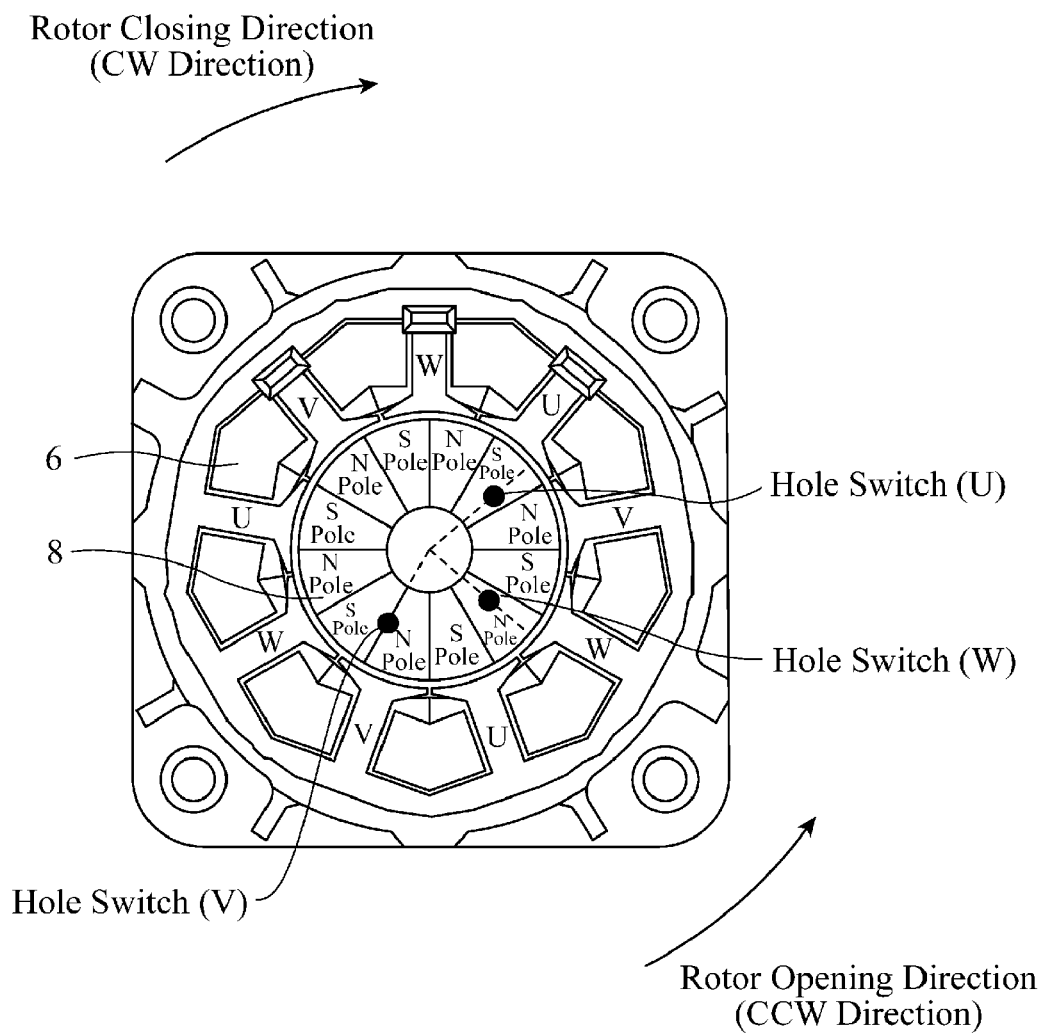
FIG. 2 is a plan view of the brushless motor shown in FIG. 1 when viewed from a motor shaft end surface of the brushless motor.

FIG. 2 is a plan view of the brushless motor shown in FIG. 1 when viewed from a motor shaft end surface of the brushless motor. The number of slots of the stator 6 of this brushless motor 1 is "9", the number of poles of the rotor 4 is "12", and the number of poles of the magnet 8 for magnetic pole position detection is "12". The brushless motor device in which the number of poles of the rotor 4 and the number of poles of the magnet 8 for magnetic pole position detection are the same as each other, as mentioned above, and three hole switches 10 are provided is referred to as a "single-precision brushless motor device" in this specification. The hole switches 10 arranged opposite to the magnet 8 for magnetic pole position detection are comprised of three hole switches: a U hole switch, a V hole switch, and a W hole switch, as shown in FIG. 2.

Figure 3:
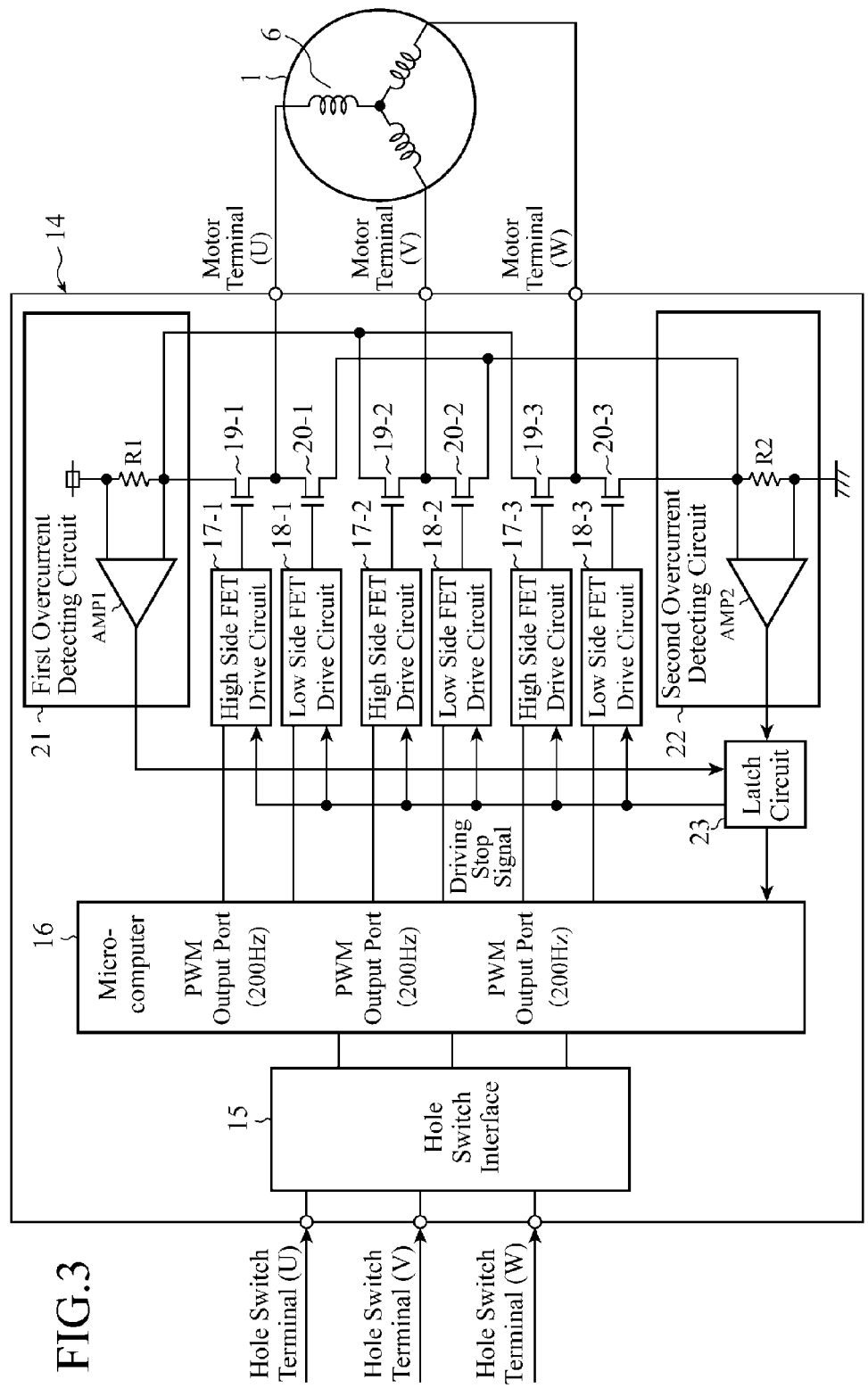
FIG. 3 is a block diagram showing the configuration of a control device for controlling driving of the brushless motor shown in FIG. 1.

FIG. 3 is a block diagram showing the configuration of a control device for controlling the driving of the brushless motor shown in FIG. 1. As shown in FIG. 3, the control device 14 is provided with a hole switch interface 15, a microcomputer 16, high side FET drive circuits 17-1 to 17-3, low side FET drive circuits 18-1 to 18-3, high side FETs 19-1 to 19-3, low side FETs 20-1 to 20-3, a first overcurrent detecting circuit 21, a second overcurrent detecting circuit 22, and a latch circuit 23. The control device 14 can be disposed integrally as a control unit of the brushless motor 1, or can be disposed as an electronic control unit separate from the brushless motor 1.

The hole switch interface 15 receives a signal sent thereto, via a hole switch terminal (U), from the U hole switch, a signal sent thereto, via a hole switch terminal (V), from the V hole switch, and a signal sent thereto, via a hole switch terminal (W), from the W hole switch, and performs predetermined amplification etc. on the signals and sends the signals to the microcomputer 16.

The microcomputer (control unit) 16 generates motor control signals on the basis of the signals sent thereto from the hole switch interface 15, and sends the motor control signals to the high side FET drive circuits 17-1 to 17-3 and the low side FET drive circuits 18-1 to 18-3 from its PWM output ports respectively. The microcomputer 16 also stops the generation of the motor control signals when receiving a driving stop signal sent thereto from the latch circuit 23.

When no driving stop signal has been sent thereto from the latch circuit 23, the high side FET drive circuits (driving circuit) 17-1 to 17-3 generate driving signals on the basis of the motor control signals sent thereto from the microcomputer 16, and send the driving signals to the gates of the high side FETs (driving circuit) 19-1 to 19-3 respectively. The high side FETs 19-1 to 19-3 are turned on according to the driving signals sent thereto at predetermined times from the high side FET drive circuits 17-1 to 17-3, and send a current sent thereto via a resistor R1 of the first overcurrent detecting circuit 21 from a power supply to the windings of the stator 6 of the brushless motor 1 via a motor terminal (U), a motor terminal (V), and a motor terminal (W) respectively.

When no driving stop signal has been sent thereto from the latch circuit (driving circuit) 23, the low side FET drive circuits (driving circuit) 18-1 to 18-3 generate driving signals on the basis of the motor control signals sent thereto from the microcomputer 16, and send the driving signals to the gates of the low side FETs (driving circuit) 20-1 to 20-3 respectively. The low side FETs 20-1 to 20-3 are turned on according to the driving signals sent thereto at predetermined times from the low side FET drive circuits 18-1 to 18-3, and feed currents furnished thereto from the windings of the stator 6 via the motor terminal (U), the motor terminal (V) and the motor terminal (W) to a ground via a resistor R2 of the second overcurrent detecting circuit 22 respectively.

The first overcurrent detecting circuit (driving circuit) 21 is comprised of the resistor R1 and an operational amplifier AMP1 for detecting a voltage across the both ends of the resistor R1, and, when detecting that the current flowing from the power supply into one winding of the stator 6 via the corresponding one of the high side FETs 19-1 to 19-3 is equal to or larger than a predetermined amount, generates an over-current signal showing the occurrence of the over-current, and sends the over-current signal to the latch circuit 23. The second overcurrent detecting circuit (driving circuit) 22 is comprised of the resistor R2 and an operational amplifier AMP2 for detecting a voltage across the both ends of the resistor R2, and, when detecting that the current flowing from one winding of the stator 6 into the ground via the corresponding one of the low side FETs 20-1 to 20-3 is equal to or larger than a predetermined amount, sends an over-current signal showing the occurrence of the over-current to the latch circuit 23.

The latch circuit (driving circuit) 23 latches the over-current signals sent from the first overcurrent detecting circuit 21 and the second overcurrent detecting circuit 22, and send each of them to the high side FET drive circuits 17-1 to 17-3 and the low side FET drive circuits 18-1 to 18-3 as the driving stop signal and also sends it to the microcomputer 16. Accordingly, while the generation of the driving signals by the high side FET drive circuits 17-1 to 17-3 and the low side FET drive circuits 18-1 to 18-3 is stopped, the generation of the motor control signals by the microcomputer 16 is stopped.

When driving the brushless motor 1 in a rotor opening direction (a CCW direction) by using a 120-degree energization method, the control device 14 turns on the high side FET 19-2 and the low side FET 20-1 in the case in which the energizing direction is the one from phase V to phase U. Accordingly, the current flows through the following route: the power supply→the first overcurrent detecting circuit 21→the high side FET 19-2→the motor terminal (V)→the windings of the stator 6→the motor terminal (U)→the low side FET 20-1→the second overcurrent detecting circuit 22→the ground, and the windings of the stator 6 are then excited.

The control device turns on the high side FET 19-3 and the low side FET 20-1 in the case in which the energizing direction is the one from phase W to phase U. Accordingly, the current flows through the following route: the power supply→the first overcurrent detecting circuit 21→the high side FET 19-3→the motor terminal (W)→the windings of the stator 6→the motor terminal (U)→the low side FET 20-1→the second overcurrent detecting circuit 22→the ground, and the windings of the stator 6 are then excited.

The control device turns on the high side FET 19-3 and the low side FET 20-2 in the case in which the energizing direction is the one from phase W to phase V. Accordingly, the current flows through the following route: the power supply→the first overcurrent detecting circuit 21→the high side FET 19-3→the motor terminal (W)→the windings of the stator 6→the motor terminal (V)→the low side FET 20-2→the second overcurrent detecting circuit 22→the ground, and the windings of the stator 6 are then excited.

The control device turns on the high side FET 19-1 and the low side FET 20-2 in the case in which the energizing direction is the one from phase U to phase V. Accordingly, the current flows through the following route: the power supply→the first overcurrent detecting circuit 21→the high side FET 19-1→the motor terminal (U)→the windings of the stator 6→the motor terminal (V)→the low side FET 20-2→the second overcurrent detecting circuit 22→the ground, and the windings of the stator 6 are then excited.

The control device turns on the high side FET 19-1 and the low side FET 20-3 in the case in which the energizing direction is the one from phase U to phase W. Accordingly, the current flows through the following route: the power supply→the first overcurrent detecting circuit 21→the high side FET19-1→the motor terminal (U)→the windings the stator 6→the motor terminal (W)→the low side FET 20-3→the second overcurrent detecting circuit 22→the ground, and the windings of the stator 6 are then excited.

The control device turns on the high side FET 19-2 and the low side FET 20-3 in the case in which the energizing direction is the one from phase V to phase W. Accordingly, the current flows through the following route: the power supply→the first overcurrent detecting circuit 21→the high side FET 19-2→the motor terminal (V)→the windings of the stator 6→the motor terminal (W)→the low side FET 20-3→the second overcurrent detecting circuit 22→the ground, and the windings of the stator 6 are then excited.

In contrast, when driving the brushless motor 1 in the rotor opening direction (the CCW direction) by using a 180-degree energization method, the control device 14 turns on the high side FET 19-2 and the low side FETs 20-1 and 20-3 in the case in which the energizing direction is the one from phase V to phases U and W. Accordingly, the current flows through the following route: the power supply→the first overcurrent detecting circuit 21→the high side FET 19-2→the motor terminal (V)→the windings of the stator 6→the motor terminals (U and W)→the low side FETs 20-1 and 20-3→the second overcurrent detecting circuit 22→the ground, and the windings of the stator 6 are then excited.

The control device 14 turns on the high side FETs 19-2 and 19-3 and the low side FET 20-1 in the case in which the energizing direction is the one from phases V and W to phase U. Accordingly, the current flows through the following route: the power supply→the first overcurrent detecting circuit 21→the high side FETs 19-2 and 19-3→the motor terminals (V and W)→the windings of the stator 6→the motor terminal (U)→the low side FET 20-1→the second overcurrent detecting circuit 22→the ground, and the windings of the stator 6 are then excited.

The control device 14 turns on the high side FET 19-3 and the low side FETs 20-1 and 20-2 in the case in which the energizing direction is the one from phase W to phases U and V. Accordingly, the current flows through the following route: the power supply→the first overcurrent detecting circuit 21→the high side FET 19-3→the motor terminal (W)→the windings of the stator 6→the motor terminals (U and V)→the low side FETs 20-1 and 20-2→the second overcurrent detecting circuit 22→the ground, and the windings of the stator 6 are then excited.

The control device 14 turns on the high side FETs 19-1 and 19-3 and the low side FET 20-2 in the case in which the energizing direction is the one from phases U and W to phase V. Accordingly, the current flows through the following route: the power supply→the first overcurrent detecting circuit 21→the high side FETs 19-1 and 19-3→the motor terminals (U and W)→the windings of the stator 6→the motor terminal (V)→the low side FET 20-2→the second overcurrent detecting circuit 22→the ground, and the windings of the stator 6 are then excited.

The control device 14 turns on the high side FET 19-1 and the low side FETs 20-2 and 20-3 in the case in which the energizing direction is the one from phase U to phases V and W. Accordingly, the current flows through the following route: the power supply→the first overcurrent detecting circuit 21→the high side FET 19-1→the motor terminal (U)→the windings of the stator 6→the motor terminals (V and W)→the low side FETs 20-2 and 20-3→the second overcurrent detecting circuit 22→the ground, and the windings of the stator 6 are then excited.

The control device 14 turns on the high side FETs 19-1 and 19-2 and the low side FET 20-3 in the case in which the energizing direction is the one from phases U and V to phase W. Accordingly, the current flows through the following route: the power supply→the first overcurrent detecting circuit 21→the high side FETs 19-1 and 19-2→the motor terminals (U and V)→the windings of the stator 6→the motor terminal (W)→the low side FET 20-3→the second overcurrent detecting circuit 22→the ground, and the windings of the stator 6 are then excited.

FIG. 4 is a view for explaining a relation among the energizing direction, the electrical angle, and the outputs of the hole switches at the time of driving the brushless motor device shown in FIG. 1, FIG. 4(*a*) shows the case of the 120-degree energization driving, and FIG. 4(*b*) shows the case of the 180-degree energization driving. Each of FIGS. 4(*a*) and 4(*b*) shows an energization switching pattern of the single-precision brushless motor device shown in FIG. 2.

In the case of the single-precision brushless motor device, the magnet 8 for magnetic pole position detection having 12 poles and the three hole switches 10 are used. In this case, the U hole switch, the V hole switch, and the W hole switch which correspond to phase U, phase V, and phase W respectively are arranged at equiangular intervals (an electrical angle of 120 degrees) in a pair of N and S poles (an electrical angle of 360 degrees), and there exist six states during one cycle of one pair of N and S poles (a mechanical angle of 60 degrees, an electrical angle of 360 degrees).

As shown in FIG. 4(*a*), in the case of the 120-degree energization driving, when rotating the rotor 4 in a valve opening direction of opening the valve 11 (in an opening direction), the energization is repeatedly performed on each of the windings of phase U, phase V, and phase W of the stator 6 in order of V→U, W→U, W→V, U→V, U→W, and V→W. In contrast, when rotating the rotor 4 in the valve closing direction of closing the valve 11 (in a closing direction), the energization is repeatedly performed on each of the windings of phase U, phase V, and phase W of the stator 6 in order of W→V, W→U, V→U, V→W, U→W, and U→V.

On the other hand, as shown in FIG. 4(*b*), in the case of the 180-degree energization driving, when rotating the rotor 4 in the valve opening direction of opening the valve 11 (in the opening direction), the energization is repeatedly performed on each of the windings of phase U, phase V, and phase W of the stator 6 in order of V→UW, VW→U, W→UV, UW→V, U→VW, UV→W, and V→UW. In contrast, when rotating the rotor 4 in the valve closing direction of closing the valve 11 (in the closing direction), the energization is repeatedly performed on each of the windings of phase U, phase V, and phase W of the stator 6 in order of UW→V, W→UV, VW→U, V→UW, UV→W, U→VW, and UW→V.

Figure 5:
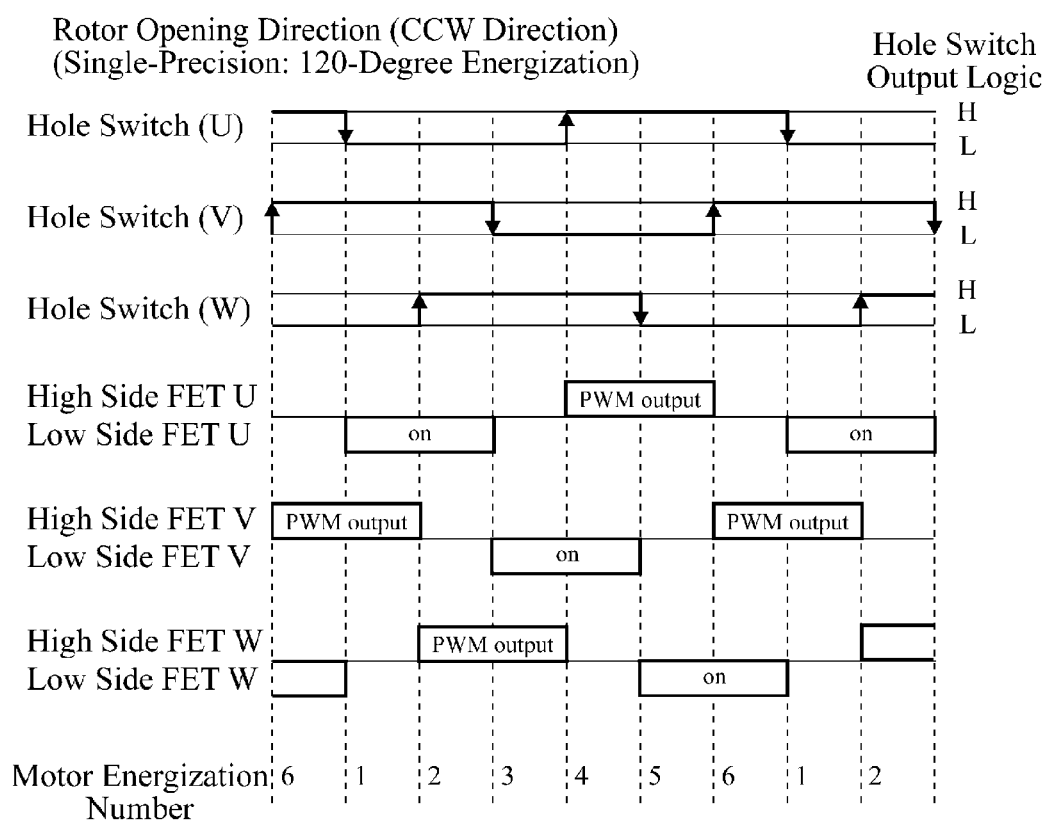
FIG. 5 is a timing chart showing a relation between the energizing direction at the time of rotating a rotor in a valve opening direction of a valve, and the signals outputted from the hole switches in the case of using a 120-degree energization method with an advance angle of 0 degrees.

FIG. 5 is a timing chart showing a relation between the energizing direction at the time of rotating the rotor in the valve opening direction of opening the valve and the signals outputted from the hole switches in the case of using the 120-degree energization method with an advance angle of 0 degrees. On the basis of the signals sent from the hole switches 10, the microcomputer 16 switches on and off the high side FET 19-1 (high side FET U), the high side FET 19-2 (high side FET V), the high side FET 19-3 (high side FET W), the low side FET 20-1 (low side FET U), the low side FET 20-2 (low side FET V), and the low side FET 20-3 (low side FET W) in turn at times as shown in the figure in ascending order of motor energization numbers so as to rotate the rotor 4 in the valve opening direction.

Figure 6:
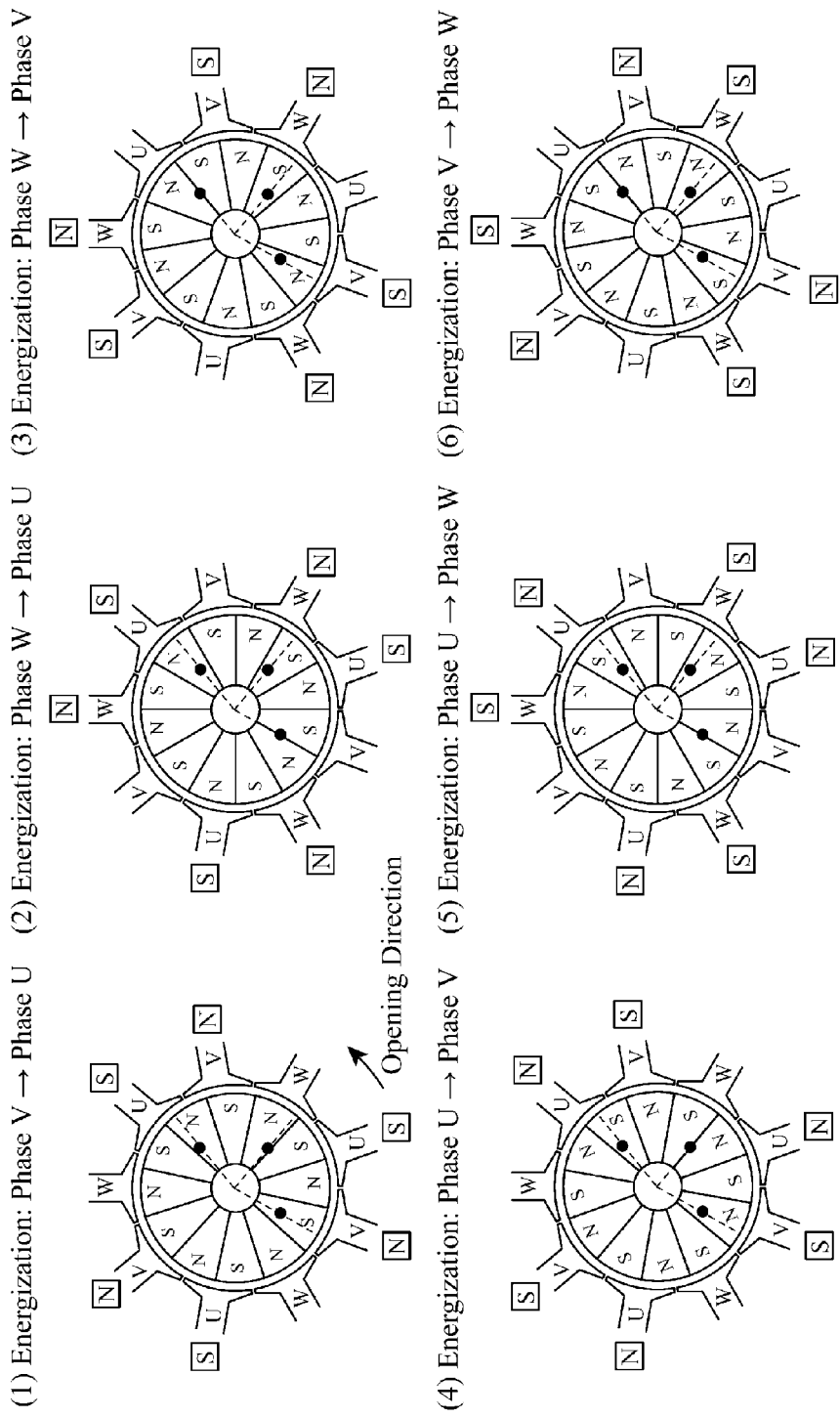
FIG. 6 is a view showing the order of energizations in the case of rotating the rotor in the valve opening direction by using the energization patterns of the 120-degree energization method, and the torque point of the rotor in each energization.

FIG. 6 is a view showing the order of energizations in the case of rotating the rotor in the valve opening direction by using the energization patterns of the 120-degree energization method, and the torque point of the rotor in each energization. That is, in order to advance the rotor 4 in the valve opening direction, the energization patterns have to be changed in order of the motor energization numbers (1)→(6) each shown by the number with a parenthesis in the figure.

Figure 7:
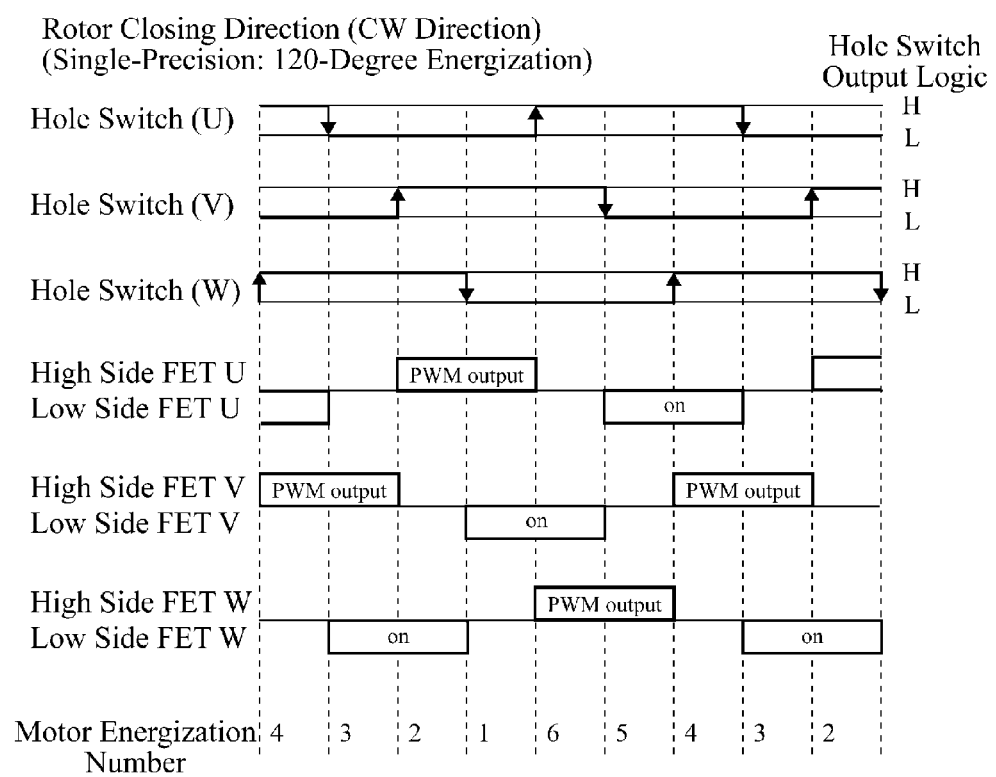
FIG. 7 is a timing chart showing a relation between the energizing direction at the time of rotating the rotor in a valve closing direction of closing the valve, and the signals outputted from the hole switches in the case of using the 120-degree energization method with an advance angle of 0 degrees

FIG. 7 is a timing chart showing a relation between the energizing direction at the time of rotating the rotor in the valve closing direction of closing the valve, and the signals outputted from the hole switches in the case of using the 120-degree energization method with an advance angle of 0 degrees. On the basis of the signals sent from the hole switches 10, the microcomputer 16 switches on and off the high side FET 19-1 (high side FET U), the high side FET 19-2 (high side FET V), the high side FET 19-3 (high side FET W), the low side FET 20-1 (low side FET U), the low side FET 20-2 (low side FET V), and the low side FET 20-3 (low side FET W) in turn at times as shown in the figure in descending order of motor energization numbers so as to rotate the rotor 4 in the valve closing direction.

Figure 8:
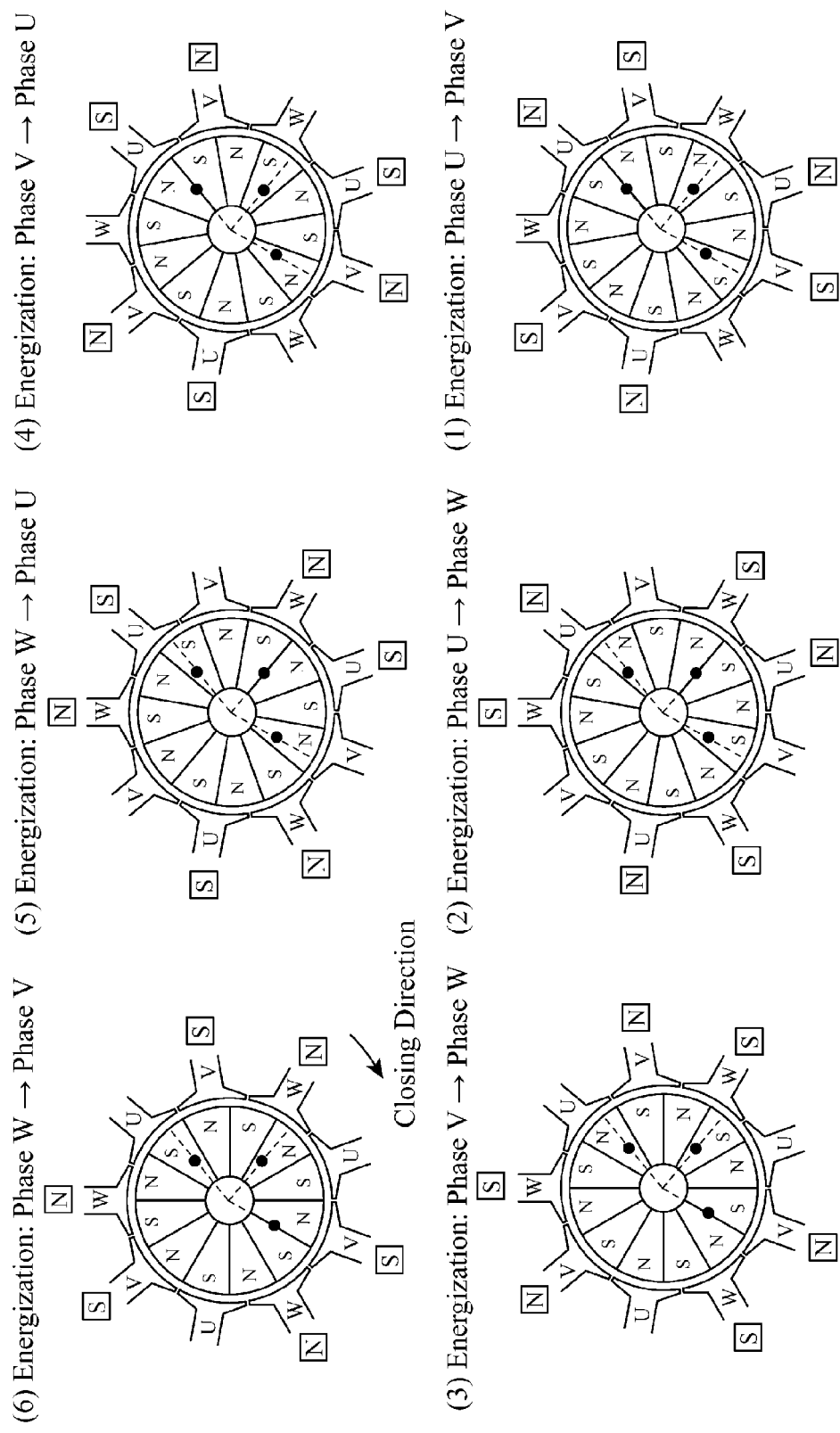
FIG. 8 is a view showing the order of energizations in the case of rotating the rotor in the valve closing direction by using the energization patterns of the 120-degree energization method, and the torque point of the rotor in each energization.

FIG. 8 is a view showing the order of energizations in the case of rotating the rotor in the valve closing direction by using the energization patterns of the 120-degree energization method, and the torque point of the rotor in each energization. That is, in order to advance the rotor 4 in the valve closing direction, the energization patterns have to be changed in order of the motor energization numbers (6)→(1) each shown by the number with a parenthesis in the figure.

Figure 9:
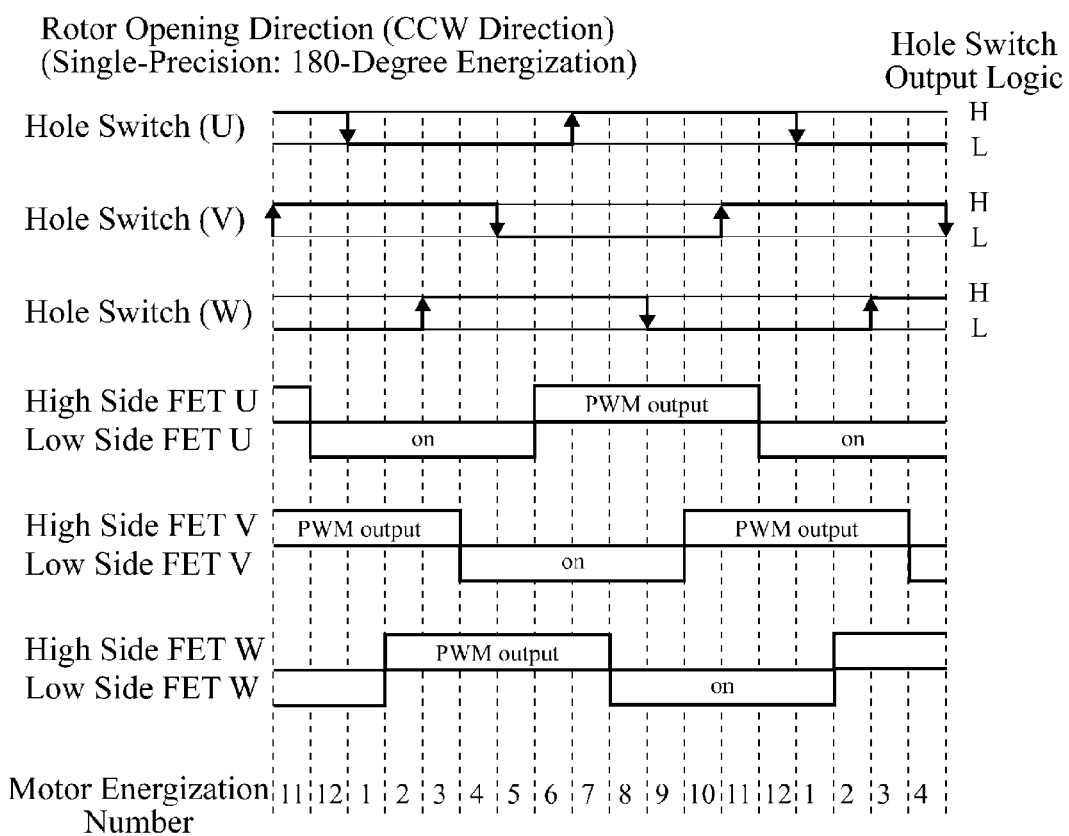
FIG. 9 is a timing chart showing a relation between the energizing direction at the time of rotating the rotor in the valve opening direction of opening the valve, and the signals outputted from the hole switches in the case of using a 180-degree energization method with an advance angle of 0 degrees.

FIG. 9 is a timing chart showing a relation between the energizing direction at the time of rotating the rotor in the valve opening direction of opening the valve, and the signals outputted from the hole switches in the case of using the 180-degree energization method with an advance angle of 0 degrees. On the basis of the signals sent from the hole switches 10, the microcomputer 16 switches on and off the high side FET 19-1 (high side FET U), the high side FET 19-2 (high side FET V), the high side FET 19-3 (high side FET W), the low side FET 20-1 (low side FET U), the low side FET 20-2 (low side FET V), and the low side FET 20-3 (low side FET W) in turn at times as shown in the figure in ascending order of motor energization numbers so as to rotate the rotor 4 in the valve opening direction.

Figure 10:
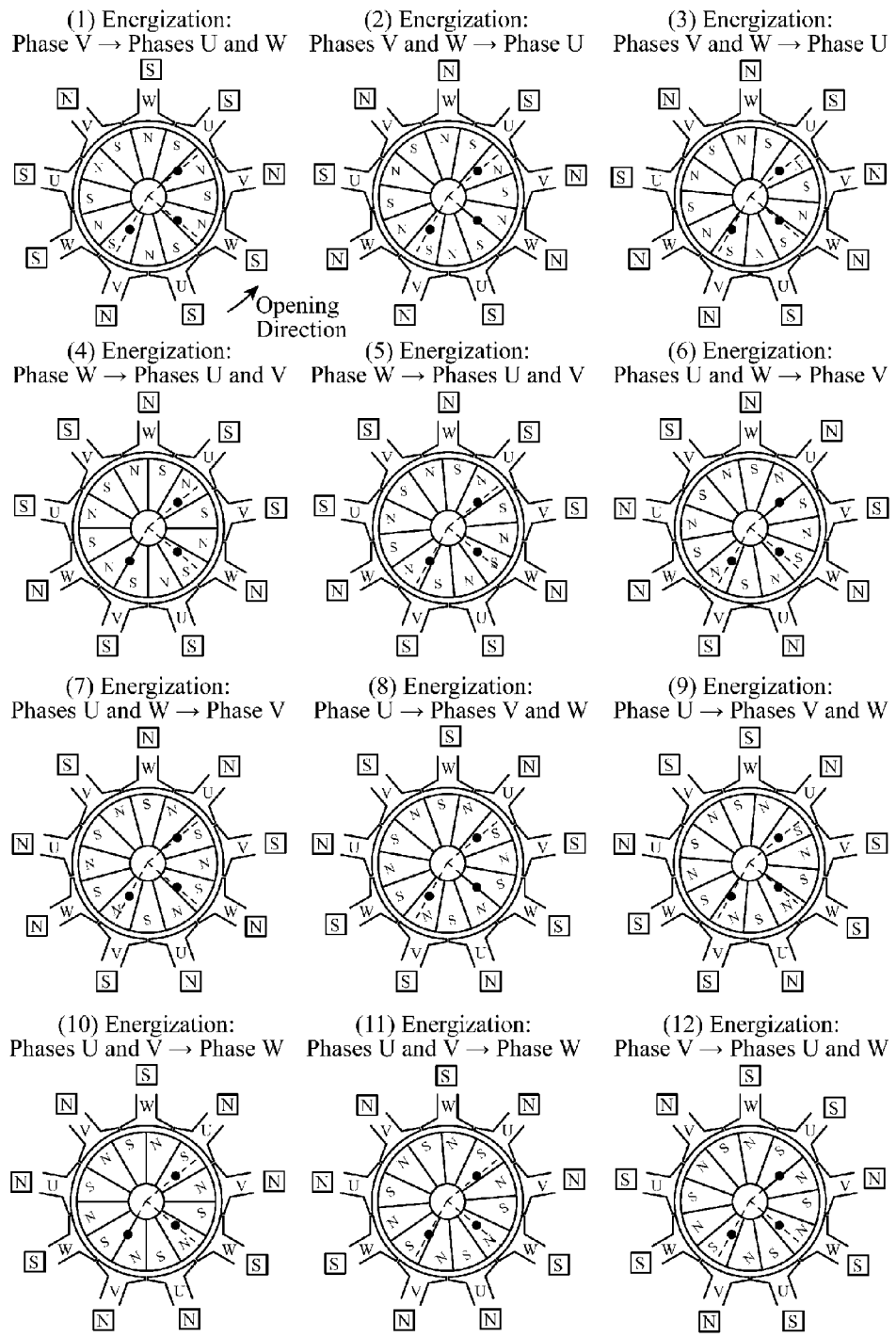
FIG. 10 is a view showing the order of energizations in the case of rotating the rotor in the valve opening direction by using the energization patterns of the 180-degree energization method, and the torque point of the rotor in each energization.

FIG. 10 is a view showing the order of energizations in the case of rotating the rotor in the valve opening direction by using the energization patterns of the 180-degree energization method, and the torque point of the rotor in each energization. That is, in order to advance the rotor 4 in the valve opening direction, the energization patterns have to be changed in order of the motor energization numbers (1)→(12) each shown by the number with a parenthesis in the figure.

Figure 11:
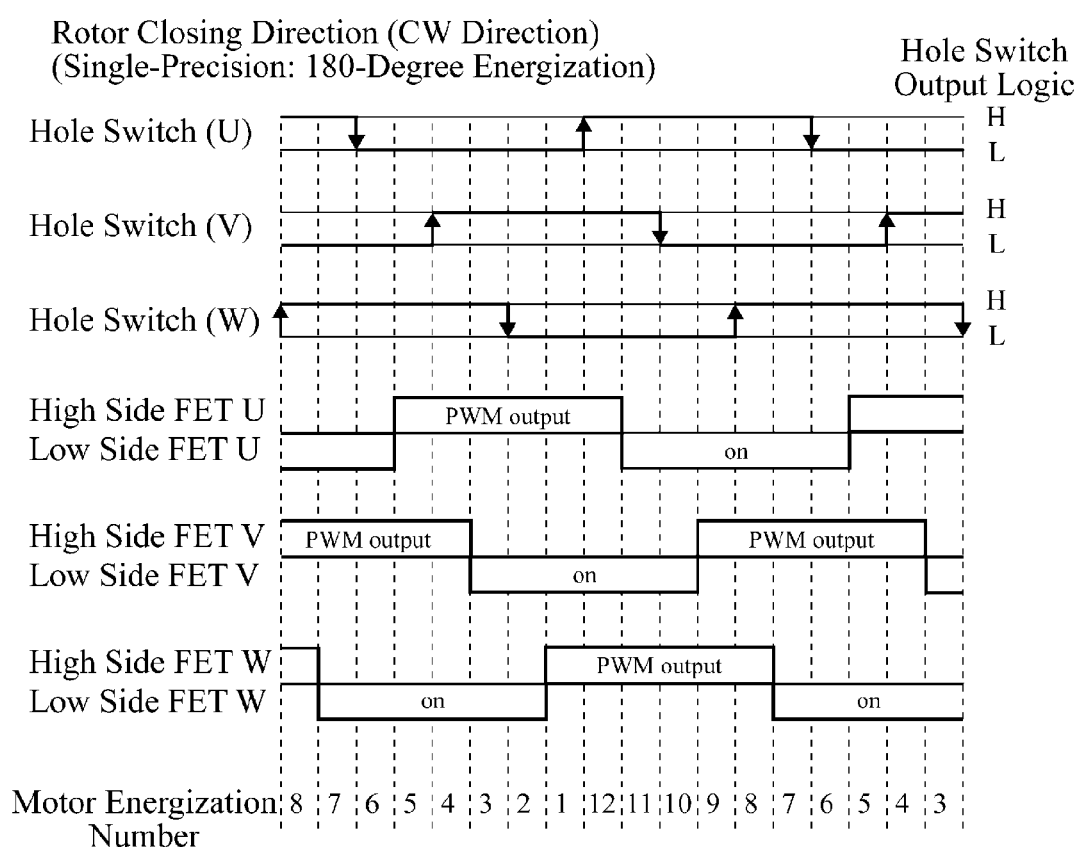
FIG. 11 is a timing chart showing a relation between the energizing direction at the time of rotating the rotor in the valve closing direction of closing the valve, and the signals outputted from the hole switches in the case of using the 180-degree energization method with an advance angle of 0 degrees.

FIG. 11 is a timing chart showing a relation between the energizing direction at the time of rotating the rotor in the valve closing direction of closing the valve, and the signals outputted from the hole switches in the case of using the 180-degree energization method with an advance angle of 0 degrees. On the basis of the signals sent from the hole switches 10, the microcomputer 16 switches on and off the high side FET 19-1 (high side FET U), the high side FET 19-2 (high side FET V), the high side FET 19-3 (high side FET W), the low side FET 20-1 (low side FET U), the low side FET 20-2 (low side FET V), and the low side FET 20-3 (low side FET W) in turn at times as shown in the figure in descending order of motor energization numbers so as to rotate the rotor 4 in the valve closing direction.

Figure 12:
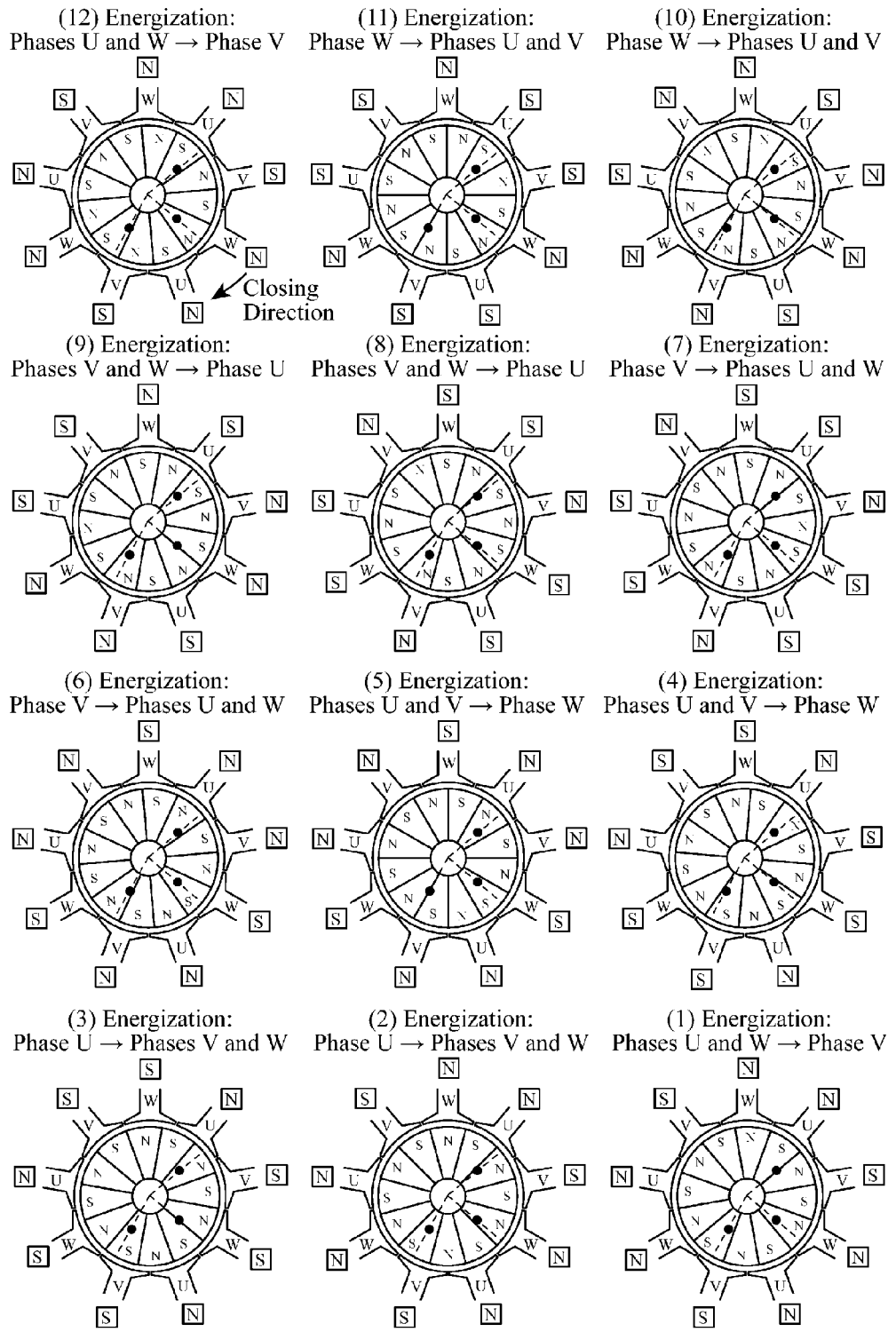
FIG. 12 is a view showing the order of energizations in the case of rotating the rotor in the valve closing direction by using the energization patterns of the 180-degree energization method, and the torque point of the rotor in each energization.

FIG. 12 is a view showing the order of energizations in the case of rotating the rotor in the valve closing direction by using the energization patterns of the 180-degree energization method, and the torque point of the rotor in each energization. That is, in order to advance the rotor 4 in the valve closing direction, the energization patterns have to be changed in order of the motor energization numbers (12)→(1) each shown by the number with a parenthesis in the figure.

Next, the control of the driving of the brushless motor 1 in accordance with this Embodiment 1 will be explained.

(1) Switching Between the Energization Methods

First, an explanation will be made by taking a case in which the brushless motor 1 is a single-precision one as an example. The microcomputer 16 of the control device 14 calculates the rotational speed of the brushless motor 1 on the basis of the detection signals showing the rotational position inputted thereto from the hole switches 10 via the hole switch interface 15. In this case, when the rotational speed falls within a low or medium speed region equal to or lower than a predetermined threshold, the microcomputer drives the brushless motor 1 by using the 120-degree energization method without carrying out control with an advance angle (with an advance angle of 0 degrees).

After that, when the rotational speed rises and reaches a high-speed region higher than the above-mentioned predetermined threshold, the microcomputer 16 switches from the 120-degree energization to the 180-degree energization of advancing the electrical angle by a predetermined advance amount to drive the brushless motor 1. For example, the microcomputer advances the energization period in the 180-degree energization driving by an electrical angle of 30 degrees corresponding to half the length of the non-energization period in the 120-degree energization. In contrast, when the rotational speed falls and becomes equal to or lower than the above-mentioned predetermined threshold, the microcomputer 16 return to the 120-degree energization again from the 180-degree energization to drive the brushless motor 1.

FIG. 13 is a timing chart showing a relation between the energizing direction at the time of rotating the rotor in the valve opening direction of opening the valve and the signals outputted from the hole switches in each of the case of using the 180-degree energization with no advance angle, and the case of using the 180-degree energization driving with an advance angle of 30 degrees, FIG. 13(a) shows the case of using the 180-degree energization with no advance angle, and FIG. 13(b) shows the case of using the 180-degree energization with an advance angle of 30 degrees. When the rotational speed exceeds the above-mentioned predetermined threshold, on the basis of the signals from the hole switches 10, the microcomputer 16 switches on and off the high side FET 19-1 (high side FET U), the high side FET 19-2 (high side FET V), the high side FET 19-3 (high side FET W), the low side FET 20-1 (low side FET U), the low side FET 20-2 (low side FET V), and the low side FET 20-3 (low side FET W) in turn at times respectively advancing by an electrical angle of 30 degrees with respect to changes in the magnetic pole of the rotor 4 detected by the hole switches 10 (changes in the output logics of the hole switches 10 shown in FIG. 13), as shown in FIG. 13(b), in ascending order of motor energization numbers so as to rotate the rotor 4 in the valve opening direction.

At the times when the hole switches 10 switch respectively in the case of using the 120-degree energization (with no advance angle) shown in FIG. 5, switching of the energization in the case of using the 180-degree energization (with no advance angle) shown in FIG. 13(a) cannot be formed. However, the times when the energization switching is carried out in the case of using the 180-degree energization (with an advance angle of 30 degrees) shown in FIG. 13(b) are the same as those when the energization switching is carried out in the case of using the 120-degree energization (with no advance angle).

Figure 16:
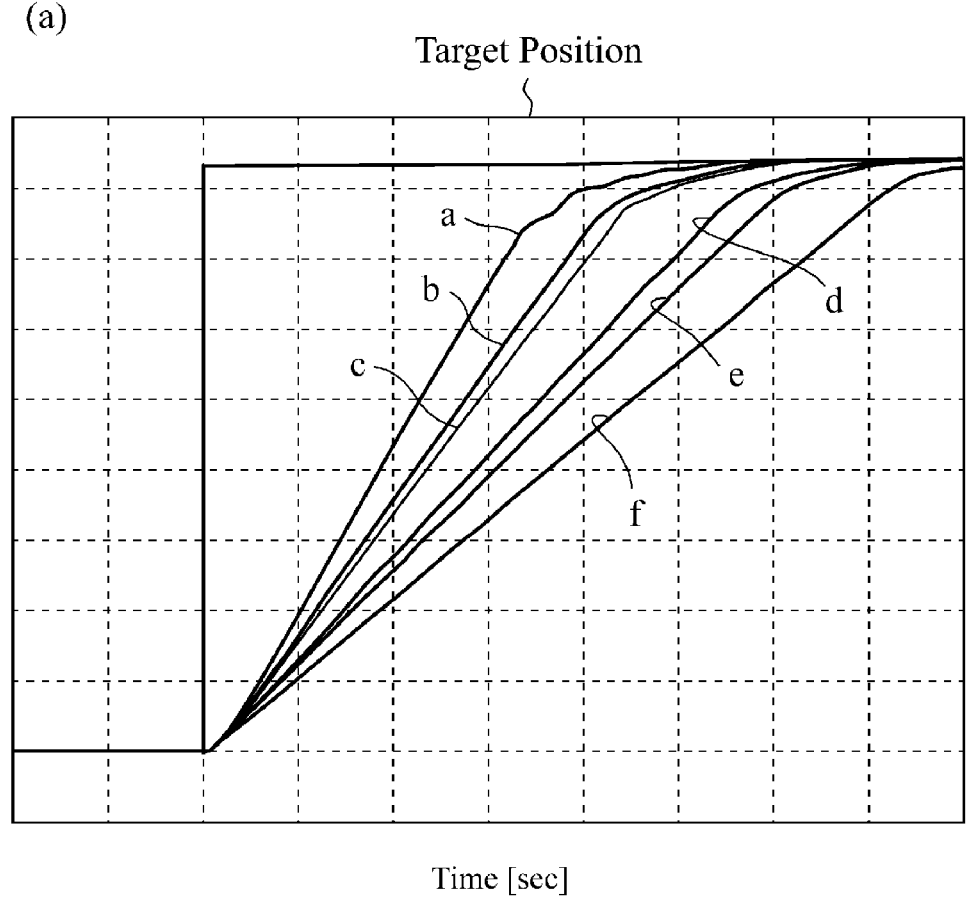
FIG. 16 is a view showing the results of simulations of the degrees of responsivity which the 120-degree energization driving with no advance angle and the 180-degree energization driving of advancing the electrical angle exhibit until the rotational speed of the rotor reaches a target position.

The results of performing simulations of the degrees of responsivity which the 120-degree energization driving (with no advance angle) and the 180-degree energization driving (with an advance angle of 30 degrees) exhibit until the position of the rotor reaches its target position in the case of changing the target position step by step, which will be mentioned below with reference to FIG. 16, show that the degree of responsivity which the 180-degree energization driving exhibits is higher than that which the 120-degree energization driving exhibits.

The case in which the advance angle amount in the case of using the 180-degree energization is set to 30 degrees in the single-precision brushless motor 1 is shown above, though the advance angle amount can be 30 degrees or less as long as it falls within a range that does not impair the responsivity of the 180-degree energization method.

Furthermore, in the above-mentioned explanation, the case in which the microcomputer switches from the 120-degree energization to the 180-degree energization according to the rotational speed of the brushless motor 1 is shown, though the microcomputer can determine the positional difference between the actual rotational position of the rotor 4 and the target position as the parameter related to the rotational speed of the brushless motor 1, and carry out energization switching according to this positional difference.

For example, the microcomputer 16 calculates the actual rotational position of the rotor on the basis of the detection signals showing the magnetic pole position of the rotor 4 sent thereto from the hole switches 10, and compares the positional difference between this actual position and the target position with a predetermined threshold. At this time, when the positional difference exceeds the predetermined threshold and differs from the actual position largely, the microcomputer switches to the 180-degree energization (with an advance angle of 30 degrees) because the microcomputer needs to raise the rotational speed to reduce the difference.

As an alternative, the microcomputer can compare the rotational speed and the positional difference with their respective thresholds, and, when at least one of them exceeds its threshold, can switch from the 120-degree energization to the 180-degree energization. By doing in this way, the microcomputer can switch to the 180-degree energization certainly when the rotor must reach an adequate rotational speed.

(2) A Hysteresis Characteristic which the Criterion by which to Determine Whether to Switch Between the Energizations has If the threshold of the parameter related to the rotational speed which is the criterion by which to determine whether to switch between the 120-degree energization and the 180-degree energization is the same in both the case in which the rotational speed as a driving condition of the brushless motor 1 is rising and the case in which the rotational speed is falling, there is a possibility that the energization switching occurs frequently every time when the rotational speed gets close to the threshold. When the energization switching thus occurs frequently, ringing occurs in the waveform of the current which is furnished to the brushless motor 1 by using any of the energization methods and the operation of the brushless motor 1 becomes unstable.

To solve this problem, in accordance with this Embodiment 1, the threshold which is the criterion by which to determine whether to switch from the 120-degree energization to the 180-degree energization when the rotational speed is rising, and the threshold which is the criterion by which to determine whether to switch from the 180-degree energization to the 120-degree energization when the rotational speed is falling are set to values apart from each other by a predetermined amount.

FIG. 14 is a view for explaining the hysteresis characteristic provided for the criterion by which to determine whether to switch between the energizations, FIG. 14(a) shows the case in which the rotational speed is rising, and FIG. 14(b) shows the case in which the rotational speed is falling. As shown in FIG. 14(a), the threshold which is the criterion by which to determine whether to switch from the 180-degree energization to the 120-degree energization is designated by A1, and the threshold which is the criterion by which to determine whether to switch from the 120-degree energization to the 180-degree energization is designated by A2. The thresholds A1 and A2 can be set in such a way as to satisfy the following inequality: threshold A1<threshold A2, and have values apart from each other by the predetermined amount which can absorb variations in the rotational speed (minute variations in the rotational speed).

The control device 14 drives the brushless motor 1, but does not switch from the 120-degree energization to the 180-degree energization even if the rotational speed rises and then exceeds the threshold A1. When the rotational speed further rises and then exceeds the threshold A2, the control device switches from the 120-degree energization (without advance angle control) to the 180-degree energization (with advance angle control). By doing in this way, even if the rotational speed goes up and down in a region around the threshold A2, this region becomes a dead zone regarding the switching from the 180-degree energization to the 120-degree energization, and therefore the control device does not carry out the energization switching frequently.

In contrast, when the rotational speed is falling, as shown in FIG. 14(b), the control device does not switch from the 180-degree energization to the 120-degree energization even if the rotational speed falls and then becomes equal to or less than the threshold A2. In addition, when the rotational speed falls and then becomes equal to or less than the threshold A1, the control device 14 switches from the 180-degree energization to the 120-degree energization (without advance angle control). Accordingly, even if the rotational speed goes up and down in a region around the threshold A1, this region becomes a dead zone regarding the switching from the 120-degree energization to the 180-degree energization, and therefore the control device does not carry out the energization switching frequently.

By thus making the criteria by which to determine whether to switch between the energizations have the hysteresis characteristic, ringing can be prevented from occurring in the waveform of the current which is furnished to the brushless motor and the brushless motor 1 can be made to operate with stability.

(3) Control of Switching Between Energization Methods in an n-Fold Precision Brushless Motor The case in which the single-precision brushless motor 1 is the target to be driven is explained until now, though the present invention can also be applied to other brushless motor devices having different configurations other than this single-precision brushless motor.

Figure 15:
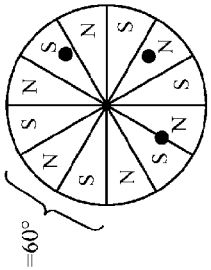
FIG. 15 is a view showing examples of the arrangement of hole switches in both a single-precision brushless motor device and a double-precision brushless motor device.

FIG. 15 is a view showing examples of the arrangement of hole switches in both the single-precision brushless motor device and a double-precision brushless motor device. In the case of the single-precision brushless motor device, the magnet 8 for magnetic pole position detection having 12 poles and the three hole switches 10 are used. In this case, the U hole switch, the V hole switch, and the W hole switch which correspond to phase U, phase V, and phase W respectively are arranged at equiangular intervals (an electrical angle of 120 degrees) in a pair of N and S poles (an electrical angle of 360 degrees), and there exist six states during one cycle of one pair of N and S poles (a mechanical angle of 60 degrees, an electrical angle of 360 degrees).

Furthermore, in order to improve the resolution of the detection of the rotational position of the rotor, a brushless motor device having a magnet 8 for magnetic pole position detection whose number of poles is increased to "24" which is twice that of the single-precision brushless motor device, as shown in FIG. 15, has been developed. Such the brushless motor device in which the magnet 8 for magnetic pole position detection has poles whose number is twice that of a rotor 4, and three hole switches 10 are disposed is referred to as a "double-precision brushless motor device" in this specification. This double-precision brushless motor device can improve the resolution of the detection of the rotational position of the rotor to be twice that of the single-precision brushless motor device.

In the double-precision brushless motor device shown in FIG. 15, a magnet 8 for magnetic pole position detection having 24 poles and three hole switches 10 are used. Furthermore, the U hole switch, the V hole switch, and the W hole switch which correspond to phase U, phase V, and phase W respectively are arranged at equiangular intervals (an electrical angle of 120 degrees) in a pair of N and S poles (an electrical angle of 360 degrees), and there exist six states during one cycle of a pair of N and S poles (a mechanical angle of 30 degrees, an electrical angle of 360 degrees). In any of the single-precision brushless motor device and the double-precision brushless motor device, the hole switches 10 play a role as the brush in the DC motor.

FIG. 16 is a view showing the results of simulations of the degrees of responsivity which the 120-degree energization driving with no advance angle and the 180-degree energization driving of advancing the electrical angle exhibit until the rotational speed of the rotor reaches the target position in a brushless motor having variations in the rotor rotational position sensor, and is aimed at the above-mentioned double-precision brushless motor device. FIG. 16(*a*) shows the result of a simulation of the behavior of the brushless motor until the rotational position of the rotor 4 reaches the target position in the case of changing the target position step by step, and FIG. 16(*b*) shows a value which is obtained by normalizing the responsivity of each of the energization methods with respect to the 120-degree energization driving (an advance angle of zero) on the basis of the result of FIG. 16(*a*). In FIG. 16, it is assumed that a PWM drive circuit (the microcomputer 16) of the brushless motor 1 has a driving duty of 100%, and the brushless motor operates on a standalone basis, i.e., under no-load conditions.

As shown in FIG. 16(*a*), the response waveform of the brushless motor 1 varies according to the energization method or its advance angle amount. The result of advancing the electrical angle by 60 degrees by using the 180-degree energization driving (a curved line a) has the highest degree of responsivity, and exhibits a degree of responsivity of 59%, as shown in FIG. 16(*b*). Furthermore, the 180-degree energization driving (a curved line b) of advancing the electrical angle by 30 degrees has a degree of responsivity of 71%, the 120-degree energization driving (a curved line c) of advancing the electrical angle by 60 degrees has a degree of responsivity of 75%, and the 120-degree energization driving (a curved line d) of advancing the electrical angle by 30 degrees has a degree of responsivity of 92%, whereas the 120-degree energization driving with no advance angle (a curved line e) and the 180-degree energization driving (a curved line f) have degrees of responsivity of 100% and 114% respectively. Thus, the degrees of responsivity of both the 120-degree energization and the 180-degree energization are improved by the advance angle control.

Therefore, in the double-precision brushless motor 1 in accordance with this Embodiment 1, when the rotational speed rises and then reaches a medium speed region exceeding a first predetermined threshold, the microcomputer 16 of the control device 14 switches from the 120-degree energization with no advance angle to the 180-degree energization of advancing the electrical angle by 30 degrees to drive the brushless motor 1. In addition, when the rotational speed further rises and then reaches a high speed region exceeding a second predetermined threshold, the microcomputer 16 switches to the 180-degree energization of further advancing the electrical angle by 30 degrees (advancing the electrical angle by 60 degrees in total) to drive the brushless motor 1.

In contrast, when the rotational speed falls and then becomes equal to or less than the above-mentioned second threshold, the microcomputer 16 returns to the 180-degree energization with an advance angle of 30 degrees to drive the brushless motor 1. When the rotational speed further becomes equal to or less than the above-mentioned first threshold, the microcomputer switches to the 120-degree energization with no advance angle. By thus carrying out the driving control, the microcomputer can switch to the 180-degree energization driving which can control the rotational speed throughout a wide range of rotational speeds which cannot be supported by the 120-degree energization without impairing both the responsibility of the 120-degree energization and that of the 180-degree energization.

As an alternative, the microcomputer can drive the brushless motor 1 in the low speed region by using the 120-degree energization of advancing the electrical angle by 30 degrees, switch to the 180-degree energization of advancing the electrical angle by 30 degrees in the medium speed region, and switch to the 180-degree energization of further advancing the electrical angle by 30 degrees to advance the electrical angle by 60 degrees in total in the high speed region. As an alternative, the microcomputer can drive the brushless motor 1 in the low and medium speed regions by using the 120-degree energization of advancing the electrical angle by 60 degrees and switch to the 180-degree energization of advancing the electrical angle by 60 degrees in the high speed region.

Figure 17:
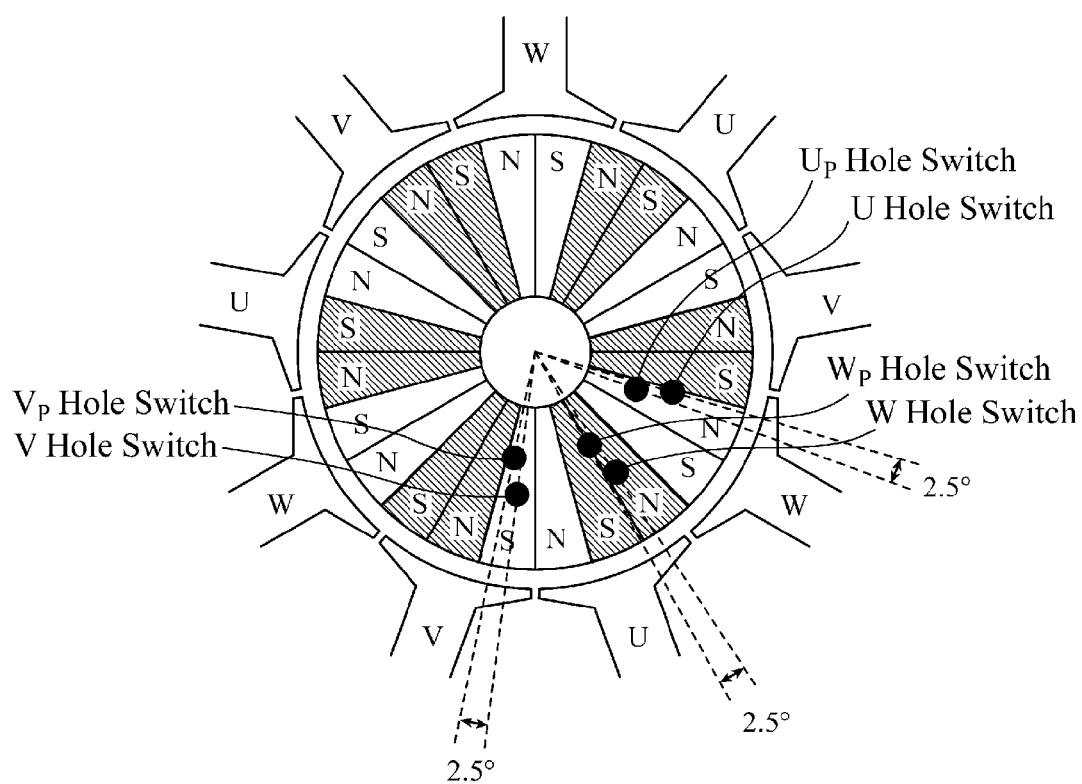
FIG. 17 is a view showing an example of the arrangement of hole switches in a quadruple-precision brushless motor device.
Figure 18:
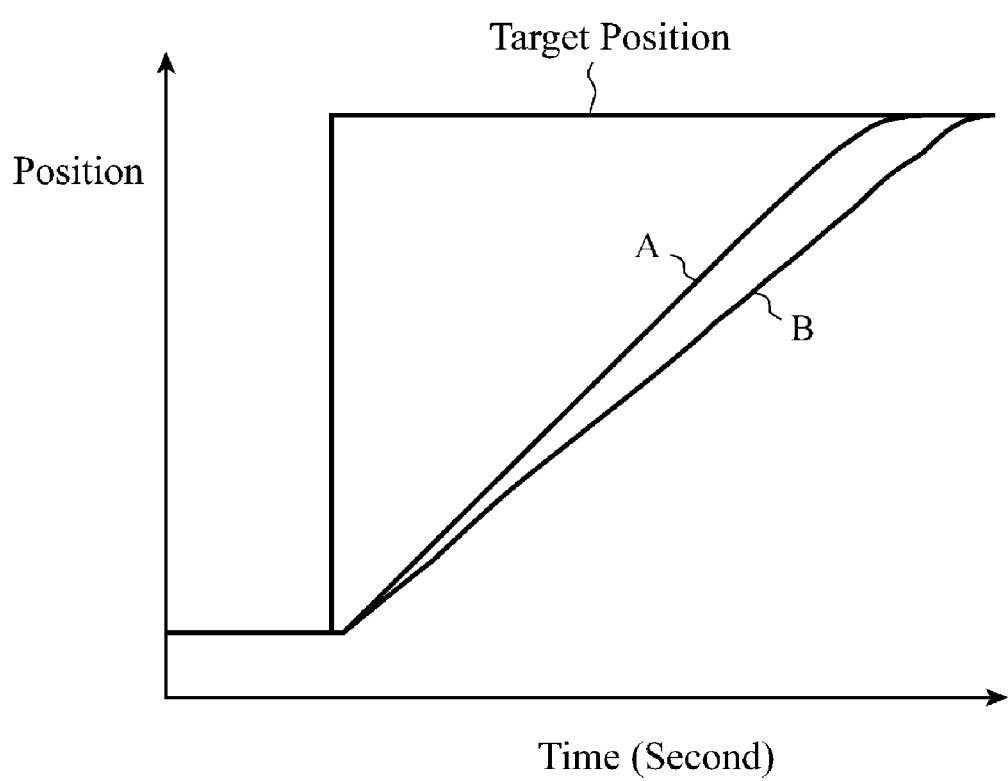
FIG. 18 is a graph showing the degrees of responsivity which a 120-degree energization with no advance angle and a 180-degree energization method exhibit until the rotational speed of a rotor reaches a target position.

FIG. 17 is a view showing an example of the arrangement of hole switches in a quadruple-precision brushless motor device. In this case, six hole switches 10 are used. A Up hole switch, a Vp hole switch, and a Wp hole switch are arranged at positions which are shifted respectively from the positions of a U hole switch, a V hole switch, and a W hole switch which are the same as those arranged in the double-precision brushless motor device shown in FIG. 15 by a predetermined offset. The offset is 1/12 of the angle of a pair of N and S poles which constructs a magnet 8 for magnetic pole position detection (a mechanical angle of 30 degrees, an electrical angle of 360 degrees), and is equal to a mechanical angle of 2.5 degrees (an electrical angle of 15 degrees).

The brushless motor device shown in FIG. 17 has a rotational position detection resolution which is twice that of the double-precision brushless motor device because it includes the Up hole switch, the Vp hole switch, and the Wp hole switch in addition to the hole switches of the double-precision brushless motor device. The present invention can also be applied to such the so-called "quadruple-precision brushless motor device". For example, the quadruple-precision brushless motor device switches from the 120-degree energization driving to the 180-degree energization of advancing the electrical angle every 15 degrees of electrical angle which is determined according to the detection accuracy of the rotor rotational position to drive the brushless motor 1. In addition, the quadruple-precision brushless motor device can carry out 150-degree energization driving.

The present invention can also be applied to an n-fold precision brushless motor device in which the number of poles of a magnet 8 for magnetic pole position detection is n times as many as that of the single-precision brushless motor device.

As mentioned above, the brushless motor device in accordance with this Embodiment 1 switches between the 120-degree energization method and the 180-degree energization method of advancing the electrical angle by 30 degrees to drive the brushless motor 1 according to the result of a comparison between the parameter value related to the rotational speed and the predetermined threshold. In this configuration, when the control device 14 calculates the rotational speed of the brushless motor 1 as the parameter related to the rotational speed and this rotational speed exceeds the predetermined threshold, the control device switches from the 120-degree energization method to the 180-degree energization method of advancing the electrical angle by 30 degrees to drive the brushless motor 1. By thus carrying out the driving control, the brushless motor device can provide an improved degree of responsivity.

Furthermore, because the brushless motor device in accordance with this Embodiment 1 uses, as the parameter related to the rotational speed, at least one of the rotational speed of the brushless motor 1 and the positional difference between the rotational position of the rotor 4 and the target position, the brushless motor device can switch to an appropriate energization method to drive the brushless motor 1 according to the rotational speed.

In addition, in accordance with this Embodiment 1, in order to reversibly switch between the 120-degree energization method and the 180-degree energization method to control the driving of the brushless motor 1, the control device 14 sets up different thresholds for the switching in the normal direction and for the switching in the opposite direction respectively, and compares the parameter value related to the rotational speed with each of the above-mentioned thresholds to carry out the switching in the normal direction or the switching in the opposite direction. By thus making the thresholds have a hysteresis characteristic, ringing can be prevented from occurring due to variations in the parameter related to the rotational speed which occur when the parameter gets close to one of the above-mentioned thresholds, and the brushless motor 1 can be made to operate with stability.

In addition, the control device 14 in accordance with this Embodiment 1 is provided with the control unit which consists of the microcomputer 16 for generating the motor control signals for controlling the driving of the brushless motor 1, and the driving circuit which consists of the high side FET drive circuits 17-1 to 17-3, the low side FET drive circuits 18-1 to 18-3, the high side FETs 19-1 to 19-3, the low side FETs 20-1 to 20-3, the first overcurrent detecting circuit 21, the second overcurrent detecting circuit 22, and the latch circuit 23, for switching between the above-mentioned energization methods of energizing the brushless motor 1 according to the motor control signals. Therefore, the responsivity of the brushless motor 1 can be improved.

In above-mentioned Embodiment 1, each threshold which is a criterion by which to determine whether to switch between the energization methods can be set to the microcomputer 16 of the control device 14 as appropriate from outside the brushless motor device by using a not-shown input unit.

INDUSTRIAL APPLICABILITY

As mentioned above, because the brushless motor device in accordance with the present invention is constructed in such a way as to switch between a 120-degree energization method and a 180-degree energization method of advancing an electrical angle by a predetermined advance angle amount to drive the brushless motor according to the result of a comparison between a parameter value related to the rotational speed of a brushless motor and a predetermined threshold, the responsivity of the brushless motor can be improved, and the brushless motor device in accordance with the present invention is suitable for use in an EGR valve and so on to which the brushless motor device is applied.

The invention claimed is:

1. A brushless motor device comprising:
   a three-phase double-precision brushless motor having a rotational position sensor for detecting a rotational position of a rotor; and
   a control device for calculating a parameter value related to a rotational speed as a parameter for switching between energization methods on a basis of a detection signal of said rotational position sensor, and for switching from a 120-degree energization method to a 180-degree energization method of advancing an electrical angle by 30 degrees to drive said brushless motor when the parameter has a value exceeding a first threshold, and further switching to a 180-degree energization method of advancing the electrical angle by 60 degrees when said parameter has a value exceeding a second threshold, wherein
   said brushless motor includes a stator arranged fixedly, a rotor which rotates when said stator is excited sequentially with a plurality of excitation patterns, said rotor having a predetermined number of poles, and a rotor rotational position sensor having a resolution corresponding to a 30-degree electrical angle of said rotor.

2. The brushless motor device according to claim 1, wherein in order to reversibly switch between the 120-degree energization method and the 180-degree energization method to control the driving of the brushless motor, the control device sets different thresholds for switching in a normal direction and for switching in an opposite direction, and compares the parameter value related to the rotational speed with said thresholds to carry out the switching in said normal direction or the switching in said opposite direction.

3. The brushless motor device according to claim 1, wherein the parameter for the switching between the energization methods includes at least one of the rotational speed of the brushless motor and a positional difference between the rotational position of the rotor and a target position of the rotor.

4. A control device for controlling driving of a brushless motor, said control device comprising:
   a control unit according to claim 1, for generating a motor control signal used for carrying out control; and
   a driving circuit for switching between energization methods of energizing said brushless motor according to said motor control signal.

* * * * *